United States Patent [11] 3,595,277

[72] Inventor Richard M. Lefever
  Springettsbury Township, York County, Pa.
[21] Appl. No. 839,347
[22] Filed July 7, 1969
[45] Patented July 27, 1971
[73] Assignee The McKay Company
  Pittsburgh, Pa.

[54] WIRE STRAIGHTENER
  13 Claims, 10 Drawing Figs.
[52] U.S. Cl. .................................................. 140/147,
  72/160, 72/162, 72/164
[51] Int. Cl. ..................................................... B21d 3/02,
  B21f 1/02, B21d 3/04
[50] Field of Search.......................................... 72/160,
  161, 162, 163, 164, 165; 140/147

[56] References Cited
  UNITED STATES PATENTS
  2,219,811  10/1940  Friedman ..................... 140/147
  2,517,309  8/1950  Heller ........................... 72/162
  3,326,025  6/1967  Nishioka ....................... 72/161
  3,343,574  9/1967  Mersek ......................... 140/147
  FOREIGN PATENTS
  5,006  2/1902  Great Britain ................. 72/160
  1,368,956  6/1963  France ........................... 140/147

Primary Examiner—Charles W. Lanham
Assistant Examiner—E. M. Combs
Attorney—Edward Hoopes, III ABSTRACT: A wire straightener comprising a planar plate, means for drawing wire having a cast along and in contact with the planar plate and in a plane parallel to the plane of the planar plate and means engaging the wire in staggered positions at opposite sides as it is drawn along and in contact with the planar plate snugging the wire against the planar plate so that axial rotation of the wire is minimized and the wire is delivered from the straightener substantially straight and free from cast. Means may be provided for controlling orientation of the wire as it moves into contact with the planar plate so that its cast lies in said plane parallel to the plane of the planar plate. Wire may be fed from a coil whose axis is substantially normal to the plane of the planar plate whereby to control the orientation of the wire as it moves from the coil into contact with the planar plate so that its cast derived from coiling lies in said plane parallel to the plane of the planar plate. A turntable may carry the coil of wire, turning to pay out wire from the coil as the wire moves from the coil into contact with the planar plate. The wire-engaging means may be rotatable elements whose axes intersect the plane of the planar plate, such elements increasing in diameter from the planar plate outwardly, as conical rollers. Cylindrical rollers whose axes are inclined to the planar plate may be employed. Elements of the surfaces of the conical or cylindrical rollers make an angle of between about 45° and about 85° with the planar plate. Means may be provided for varying the distance between the rotatable elements at opposite sides of the wire to accommodate the straightener to wires of different casts or stiffness.

PATENTED JUL 27 1971

RICHARD M. LEFEVER
INVENTOR
BY

Edward Hoopes III

HIS ATTORNEY

PATENTED JUL 27 1971 3,595,277

RICHARD M. LEFEVER
INVENTOR
BY
Edward Hooper III
HIS ATTORNEY

WIRE STRAIGHTENER

This invention relates to a wire straightener and particularly to a wire straightener in which wire having a cast or deviation from straightness is drawn along and in contact with a planar plate and is snugged against the planar plate whereby to remove or at least minimize the cast in the wire. The invention is particularly applicable to the removal or minimization of cast in wire in which the cast exists essentially in one plane, as, for example, wire which has been packaged in coil form.

The invention has especial utility in the straightening of welding wire which is packaged in coil form, typically in a cylindrical drum, and progressively withdrawn generally tangentially from the drum during welding. The wire should be straight in order to pass through a welding cable with minimum resistance.

Wire straighteners are known which have opposed grooved rollers in two planes at an angle of 180° to each other. Such a straightener has optimum effectiveness for only one diameter wire. Larger diameter wire may bind in the opposed grooved rollers and smaller diameter wire may twist in the grooves and retain cast which the straightener is intended to remove. My wire straightener effectively straightens wire of a wide range of diameters.

I provide a wire straightener comprising a planar plate, means for drawing wire having a cast along and in contact with the planar plate and in a plane parallel to the plane of the planar plate and means engaging the wire in staggered positions at opposite sides as it is drawn along and in contact with the planar plate snugging the wire against the planar plate so that axial rotation of the wire is minimized and the wire is delivered from the straightener substantially straight and free from cast. Means may be provided for controlling orientation of the wire as it moves into contact with the planar plate so that its cast lies in said plane parallel to the plane of the planar plate. Wire may be fed from a coil whose axis is substantially normal to the plane of the planar plate whereby to control the orientation of the wire as it moves from the coil into contact with the planar plate so that its cast derived from coiling lies in said plane parallel to the plane of the planar plate. A turntable may carry the coil of wire, turning to pay out wire from the coil as the wire moves from the coil into contact with the planar plate. The wire-engaging means may be rotatable elements whose axes intersect the plane of the planar plate, such elements increasing in diameter from the planar plate outwardly, as conical rollers. Cylindrical rollers whose axes are inclined to the planar plate may be employed. Elements of the surfaces of the conical or cylindrical rollers make an angle of between about 45° and about 85° with the planar plate. Means may be provided for varying the distance between the rotatable elements at opposite sides of the wire to accommodate the straightener to wires of different cast or stiffness.

In a preferred form of straightener I employ three rollers arranged so that the wire moves in a path such that the center roller engages the wire on one side and the end rollers engage the wire on the opposite side. Elements of the surfaces of the rollers make an acute angle with the planar plate whereby to snug the wire against the plate. This may be accomplished by conical rollers or inclined cylindrical rollers. The inclination of the elements of the surfaces of the rollers to the planar plate (preferably between about 45° and about 85°) creates a resultant force which holds the existing cast in the wire in the plane required to effect straightening of the wire avoiding a helix in the wire as it moves to and through the welding cable. The same force maintains the wire in proper relationship to the rollers so that the center roller exerts a pressure directly opposed to the existing cast thus making it possible to attain essentially straight wire. It is found that a straightener equipped with a particular set of rollers effectively straightens wires of a wide range of diameters. The snugging of the wire against the planar plate by the rollers may also be employed to create a constant back tension in the wire being straightened contributing to optimum control of the wire feed. The roller or rollers on one side of the wire may be mounted for adjustable positioning toward and away from the rollers or roller on the opposite side of the wire to accommodate the straightener to wires of different cast or stiffness.

Other details, objects and advantages of the invention will become apparent as the following description of certain present preferred embodiments thereof proceeds.

In the accompanying drawings I have shown certain present preferred embodiments of the invention in which FIG. 1 is an isometric view of a form of wire straightener in accordance with my invention, tapered or conical rollers being employed in this form;

Figure 5:
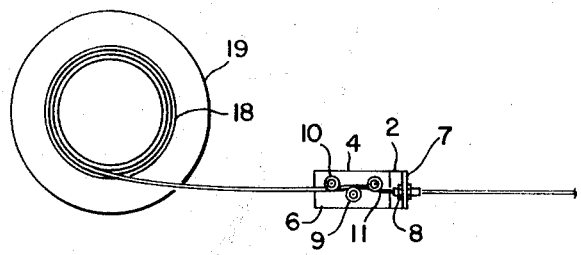
FIG. 5 is a plan view to reduced scale showing wire being fed to the wire straightener of FIGS. 1—4 from a cylindrical drum in which the wire is packaged in coil form, the drum being mounted on a turntable.
Figure 6:
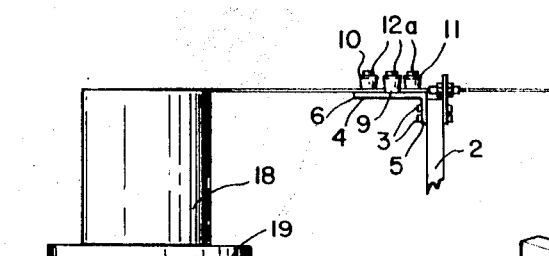
FIG. 6 is an elevational view of the structure shown in FIG. 5.
Figure 1:
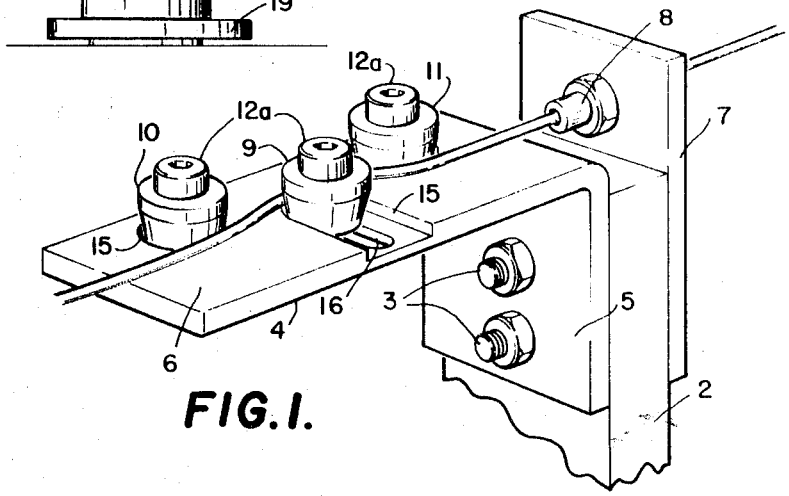
Figure 4:
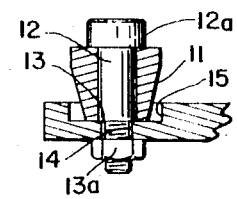
FIG. 4 is a fragmentary cross-sectional view taken on the line IV-IV of FIG. 2.
Figure 2:
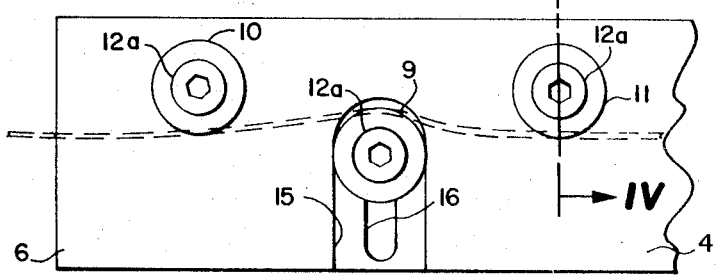
FIG. 2 is a fragmentary top plan view of a portion of the wire straightener shown in FIG. 1.
Figure 3:
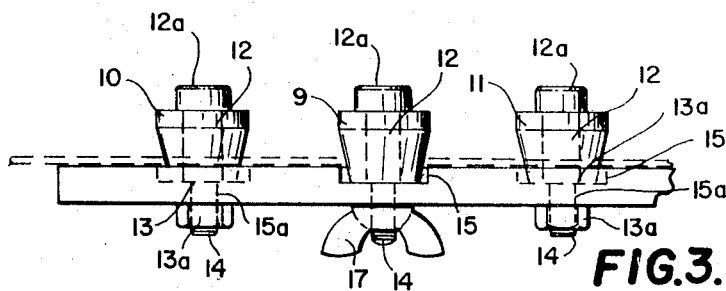
FIG. 3 is an elevational view of the structure shown in FIG. 2.
Figure 7:
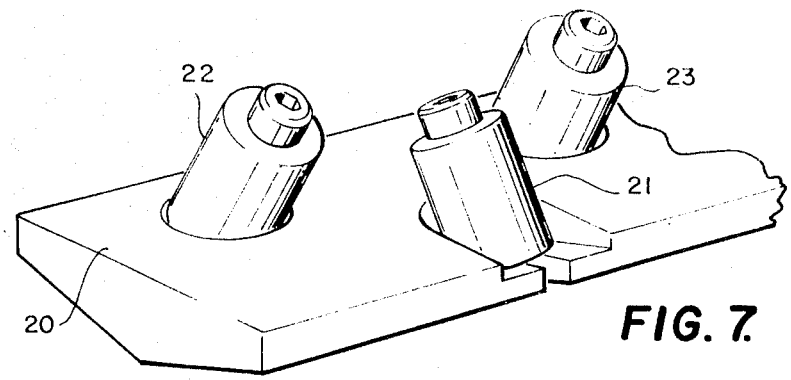
FIG. 7 is a fragmentary isometric view of a portion of a wire straightener functionally equivalent to the form of FIGS. 1—6 but employing inclined or tilted cylindrical rollers.
Figure 8:
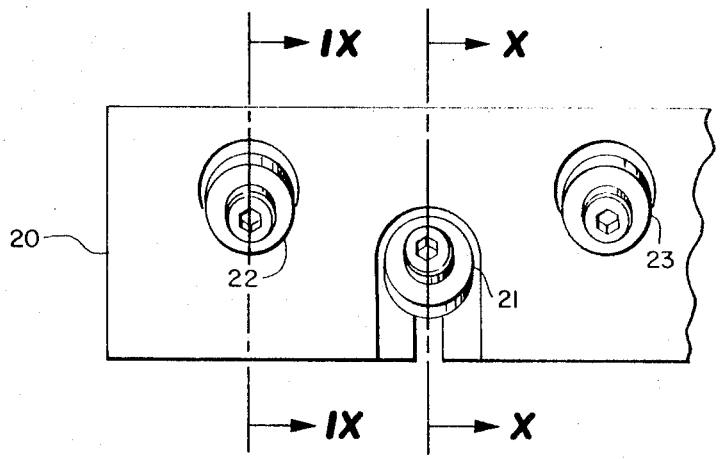
FIG. 8 is a plan view of the structure shown in FIG. 7.
Figure 9:
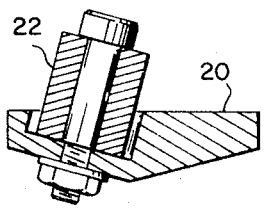
FIG. 9 is a cross-sectional view taken on the line IX-IX of FIG. 8.
Figure 10:
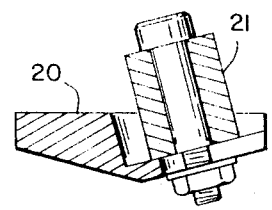
FIG. 10 is a cross-sectional view taken on the line X-X of FIG. 8.

Referring now more particularly to the drawings, there is shown in FIGS. 1, 5 and 6 a support 2 to which is fastened by bolts 3 an L-shaped bracket designated generally by reference numeral 4 one leg 5 of which lies against the support 2 and receives the bolts 3 and the other leg 6 of which constitutes a planar plate and projects horizontally from and slightly above the top of the support 2. The upper surface of the planar plate 6 constitutes a planar surface against which wire to be straightened is snugged as will presently be described. Also carried by the support 2 is a vertical plate 7 carrying a wire guide 8 having a cylindrical bore the axis of which is horizontal and parallel to the upper surface of the plate 6 and disposed at a level such that wire fed through the guide 8 lies flat against the upper surface of the plate 6. The height of the plate 7 may be adjusted for wires of different diameters to insure that each wire fed through the wire guide extends parallel to the plane of the upper surface of the plate 6 and lies flush against that surface.

The plate 6 carries three rollers designated respectively by reference numerals 9, 10 and 11. The arrangement of the rollers is as shown in the drawings so that wire fed through the guide 8 engages the rollers to be straightened thereby. In the form shown in FIGS. 1—6 the rollers 9, 10 and 11 are tapered or conical. Each of the rollers has a central bore through which passes a stud 12 having a head 12a and which is shouldered at 13 and has its lower portion 14 threaded. The portion of the stud between the shoulder 13 and the head 12a receives the roller, the diameter of the bore in the roller being just slightly greater than the diameter of the portion of the stud lying therein so that the roller is free to rotate on the stud. Also the height of the roller is just slightly less than the vertical distance between the shoulder 13 and the head 12a of the stud so that vertical binding of the stud is avoided. Each of the rollers is mounted on the plate 6 in a well 15 as clearly shown in the drawings. A cylindrical bore 15a disposed in the portion of the plate 6 below the corresponding well 15 is provided for each of the rollers 10 and 11 receiving the portion of the stud below the shoulder 13 thereof, a nut 13a being threaded thereonto and tightened up against the bottom surface of the plate 6. Thus each of the rollers 10 and 11 is mounted in fixed position on the plate 6 but is free to rotate. The roller 9 however is mounted with its stud extending through an elongated slot 16 so that it may be adjustably positioned toward and away from the opposing rollers 10 and 11. A wingnut 17 is provided for adjustably fastening the roller 9 in desired position relative to the rollers 10 and 11 so that the straightener may be adjusted to accommodate it to wires of different cast or stiffness.

Each element of the conical surface of each of the rollers 9, 10 and 11 is disposed at an acute angle to the axis of the roller and hence of the stud upon which the roller is mounted. The axis of each of the studs is preferably normal to the plate 6 so that each element of each of the conical rollers 9, 10 and 11 is disposed at an acute angle to the upper surface of the plate. Each element of the conical surface of each of the rollers makes an angle with the axis or extended axis of the roller which is not less than about 5° and not more than about 45° so that the angle between each such element and the upper surface of the plate 6 is between about 45° and about 85°.

FIGS. 5 and 6 show wire being fed to the wire straightener from a cylindrical drum 18 in which the wire is packaged in coil form as shown in FIG. 5, the drum being mounted on a turntable 19. The axis of the turntable 19 and of the drum 18 is vertical and the top of the drum, which is completely open, is in substantially the same horizontal plane as the upper surface of the plate 6. The drum is arranged so that the coil of a packaged wire within it is substantially tangent to a vertical plane containing the axis of the guide 8. Thus the wire as it is fed to the straightener has its cast or deviation from straightness in a horizontal plane, i.e., parallel to the upper surface of the plate 6. As the coiled wire is fed from the drum the wire of the coil gradually rises to the top of the drum from which it is fed out tangentially as shown in FIG. 5.

Thus the wire advancing to the straightener through the wire guide 8 is disposed flush against the upper surface of the plate 6 with its cast or deviation from straightness in a horizontal plane and in a direction such that the cast will be removed by deformation of the wire against the cast curvature of the wire by the roller 9 as shown in the drawings. By reason of the fact that the elements of the rollers which engage the wire are disposed at an angle to the upper surface of the plate 6 the wire is snugged against the plate, the inclination of the elements of the conical surfaces of the rollers creating a resultant force which holds the existing cast in the wire in the horizontal plane whereby the wire is straightened while avoiding a helix therein as it moves to and through the welding cable (not shown) to which the straightened wire is fed. The same force maintains the wire in proper relationship to the rollers so that the center roller 9 exerts a pressure directly opposed to the existing cast thus making it possible to attain essentially straight wire.

It is found that a straightener equipped with a particular set of rollers effectively straightens wires of a wide range of diameters. Also the snugging of the wire against the upper surface of the plate 6 by the rollers may be employed to create a constant back tension in the wire being straightened contributing to optimum control of the wire fed.

While I have shown the roller 9 as being adjustable toward and away from the rollers 10 and 11 it would be possible to mount the roller 9 in stationary position and the rollers 10 and 11 for adjustment toward and away from the roller 9.

FIGS. 7—10 show a portion of a form of wire straightener which is functionally equivalent to the form of FIGS. 1—6 but which employs inclined or tilted cylindrical rollers. In FIGS. 7—10 the upper planar surface of the plate against which the wire is snugged is designated 20 and the rollers which correspond to the rollers 9, 10 and 11 of FIGS. 1—6 are designated 21, 22 and 23 respectively. The rollers are mounted similarly to the rollers 9, 10 and 11 except that the rollers 21, 22 and 23 are cylindrical rather than tapered or conical and they are mounted with their axes inclined to the upper surface 20 of the wire straightener plate. The rollers snug the wire against the surface 20 in exactly the same way as the rollers 9, 10 and 11 snug the wire against the upper surface of planar plate 6. The axis of each of the cylindrical rollers 21, 22 and 23 is disposed at an angle of between about 45° and about 85° to the plane of the surface 20 in a vertical plane containing the axis of the roller, which vertical plane is normal to the axis of the wire guide (not shown but positioned like the wire guide 8 of FIGS. 1, 5 and 6).

While I have shown and described certain present preferred embodiments of the invention it is to be distinctly understood that the invention is not limited thereto but may be otherwise variously embodied within the scope of the following claims.

I claim:

1. A wire straightener comprising a planar plate, means for drawing along and in contact with the planar plate and in a plane parallel to the plane of the planar plate wire having a cast and means engaging the wire at staggered positions on opposite sides of said wire as it is drawn along and in contact with the planar plate for snugging the wire against the planar plate so that axial rotation of the wire is minimized and the wire is delivered from the straightener substantially straight and free from cast.

2. A wire straightener as claimed in claim 1 with means being provided for controlling orientation of the wire as it moves into contact with the planar plate so that its cast lies in said plane parallel to the plane of the planar pate.

3. A wire straightener as claimed in claim 1 for removing the cast from a coiled wire with means being provided for disposing the coil of wire with its axis substantially normal to the plane of the planar plate whereby to control the orientation of the wire as it moves from the coil into contact with the planar plate so that its cast derived from coiling lies in said plane parallel to the plane of the planar plate.

4. A wire straightener as claimed in claim 3 with a turntable carrying the coil of wire, which turntable turns to pay out wire from the coil as the wire moves from the coil into contact with the planar plate.

5. A wire straightener as claimed in claim 1 in which the means engaging the wire in staggered positions at opposite sides snugging the wire against the planar plate are rotatable elements whose axes intersect the plane of the planar plate, such elements increasing in diameter from the planar plate outwardly.

6. A wire straightener as claimed in claim 5 in which the rotatable elements are conical rollers.

7. A wire straightener as claimed in claim 6 in which the axes of the conical rollers are substantially normal to the plane of the planar plate.

8. A wire straightener as claimed in claim 7 in which an element of the surface of the conical rollers makes an angle of between about 5° and about 45° with the axis of the roller.

9. A wire straightener as claimed in claim 2 in which the means engaging the wire at opposite sides snugging the wire against the planar plate are conical or cylindrical rollers arranged to slightly overbend the wire contrary to the cast so that the wire is delivered from the straightener substantially straight and free from cast.

10. A wire straightener as claimed in claim 5 having means for varying the distance between the rotatable elements at opposite sides of the wire to accommodate the straightener to wires of different cast or stiffness.

11. A wire straightener as claimed in claim 1 in which the means engaging the wire in staggered positions at opposite sides snugging the wire against the planar plate are rotatable elements in the form of cylinders whose axes intersect the plane of the planar plate at an inclination which disposes each cylinder to lean over toward the wire in contact with its cylindrical face.

12. A wire straightener as claimed in claim 11 having means for varying the distance between the rotatable elements at opposite sides of the wire to accommodate the straightener to wires of different cast or stiffness.

13. A wire straightener as claimed in claim 11 in which the axes of the cylinders intersect the plane of the planar plate at an angle of between about 45° and about 85°.

UNITED STATES PATENT OFFICE
CERTIFICATE OF CORRECTION

Patent No. 3,595,277     Dated July 27, 1971

Inventor(s) Richard M. Lefever

It is certified that error appears in the above-identified patent and that said Letters Patent are hereby corrected as shown below:

In the heading of the printed specification, lines 7 and 8, "The McKay Company  Pittsburgh, Pa." should read --Teledyne, Inc., Los Angeles, California, a corporation of Delaware--.  Column 4, line 25, "pate" should be --plate--.

Signed and sealed this 7th day of March 1972.

(SEAL)
Attest:

EDWARD M. FLETCHER, JR.                ROBERT GOTTSCHALK
Attesting Officer                      Commissioner of Patents